(No Model.)
E. W. BINGHAM.
SECTIONAL HORSESHOE.
No. 374,727. Patented Dec. 13, 1887.
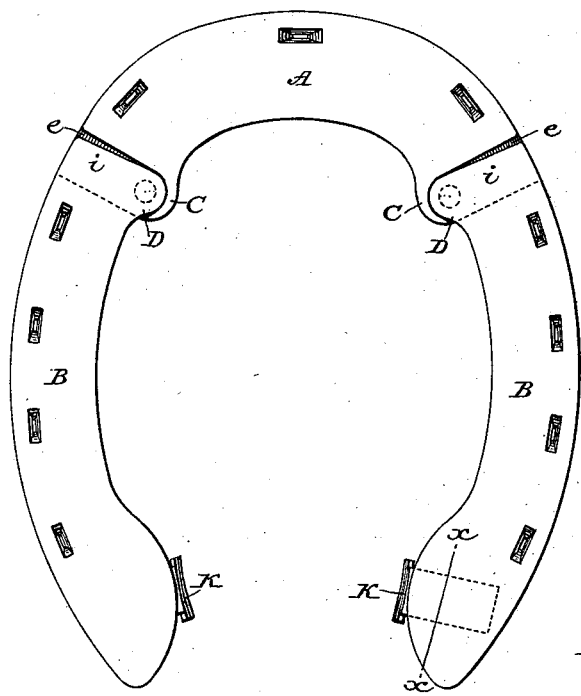
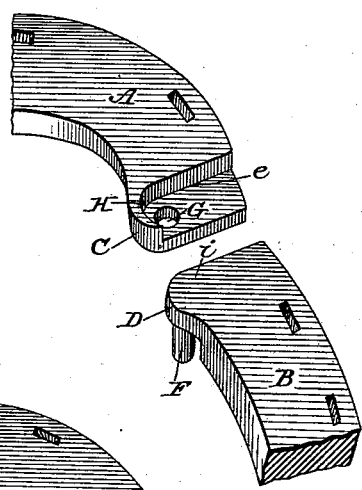
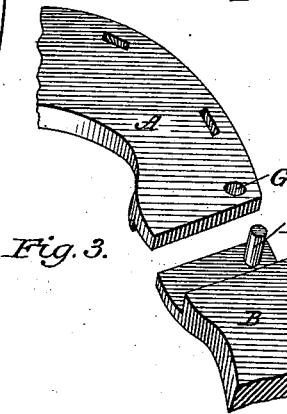
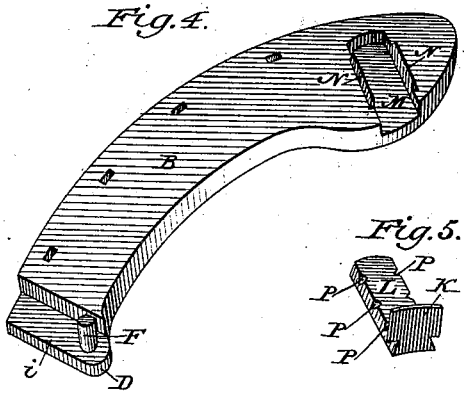
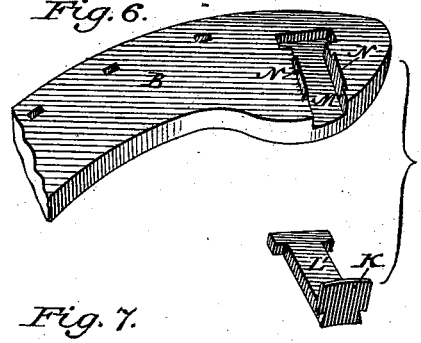
Attest:
A. N. Jesbera
M. C. Finley
Inventor:
Edward W. Bingham
By David A. Burr
Atty.

UNITED STATES PATENT OFFICE.

EDWARD W. BINGHAM, OF PORTLAND, OREGON.

SECTIONAL HORSESHOE.

SPECIFICATION forming part of Letters Patent No. 374,727, dated December 13, 1887.

Application filed July 11, 1887. Serial No. 243,929. (No model.)

*To all whom it may concern:*

Be it known that I, EDWARD W. BINGHAM, of Portland, in the county of Multnomah and State of Oregon, have invented certain new and useful Improvements in Sectional Horseshoes; and I do hereby declare that the following is a full and exact description thereof, reference being had to the accompanying drawings, and to the letters of reference marked thereon, making a part of this specification, in which—

Figure 1 is a plan view of the under or ground side of a sectional horseshoe embodying my improvements; Fig. 2, detached views of the two portions of the improved joint by which the sections of the horseshoe are united; Fig. 3, similar views of a modification in the joint; Fig. 4, a view in perspective of one of the side sections of the shoe, showing its upper or hoof face and illustrating the recess therein adapted to receive the bar-lug. Fig. 5 is a perspective view of a bar-lug detached. Fig. 6 illustrates in perspective modifications in the form of the bar-lug and its recess, the lug being shown detached; Fig. 7, a cross-section in line *x x* of Fig. 1, illustrating the connection of a bar-lug with the heel-section.

My invention is applicable to all forms of horseshoes, but is designed more particularly for use with sectional horseshoes such as are described in Letters Patent Nos. 349,080 and 340,851 as auxiliary to the devices therein shown.

It has for its object to support the heel end of the shoe firmly against outward lateral strains thereon by means of an adjustable device which will admit of being fitted closely against the bar of the foot without the necessity of paring the hoof, and which, when adjusted so as to take firm hold, may be positively secured so as to become practically an integral part of the shoe.

It consists in the combination, with the heel-sections of the shoe and with a recess formed transversely in the hoof face of each, having lateral edges adapted to be hammered down therein, of a plate carrying a bar-lug adapted to fit and to be adjusted longitudinally in said recess and formed with beveled or recessed edges to admit of being overlapped by the lateral edges of the recess when bent over and hammered down thereon.

When used with my improved sectional horseshoes, patented as above cited, the bar-lugs thus adjusted and secured serve as auxiliaries to the joints and other appliances embraced in said shoes in counteracting and preventing all tendency of the heel-sections to be twisted or broken off and in facilitating an adjustment of the several parts of the shoe to the hoof.

In the accompanying drawings, A represents the toe-section, and B B the side sections, of my improved sectional horseshoe. The two ends of the toe section A and the inner end of each side section B are respectively cut away to form counterpart recesses or rabbets parallel with the faces of the sections, which, when united to overlap each other, will form a neat lap-joint, the tongue or leaf of the joint on the hoof side of each section being made the thinnest because protected from wear.

A perforation, G, is formed, preferably, in the thicker leaf or division of each joint at one extremity thereof and as near as practicable to the edge of the section to receive a counterpart pin, F, which may be made integral with or be otherwise fixed to the thinner leaf or division of the joint in position to enter said perforation and form a lock therewith.

By placing the locking-pin at the extreme end of the joint it is made to afford a support against a torsional separation of the two parts of the joint of the two, so that the extended bearing thereof is maintained to prevent a twisting or wrenching apart of the side sections from the toe-section of the shoe when in use.

A further support may be obtained by making the ends of the toe-sections somewhat wider than the corresponding ends of the side sections, preferably by means of a semicircular or curved offset, C, formed upon the inner side of each end of the toe-section, as shown in Figs. 1 and 2. In such case the rabbet or recess *e*, cut in the toe-section to receive the counterpart leaf or division *i* of the inner end of the corresponding side section, is not extended entirely across the width of the extremity of the toe-section; but it is so far shortened as to leave a projecting wall, H, at the inner end of the rabbet, against which the corresponding end of the lapping leaf of the side section will abut and find a bearing and support, as illustrated in Fig. 2 of the drawings, said wall and the proximate edge of the abutting leaf of the side section being preferably curved upon an arc having the aperture G as its center to permit a play of the side section on the pin. The lateral bearing afforded by this wall H to the end of the jointed side section serves to re-enforce the pin F in resisting the lateral and torsional strains.

The side sections and the nails by which they are attached to the hoofs are still further protected in my invention against outward lateral and torsional strains by means of bar-lugs K K, secured to the inner ends of said sections, to project outward or upwardly from the inner end thereof into the natural recess between the bar of the hoof and frog and to bear against the former.

To facilitate the fitting of the side sections to various forms and sizes of feet, it becomes necessary to provide for an adaptation of the bar-lug with reference to the side section, so that it shall project at a greater or less distance from its inner edge to fit a greater or less width of bar in the hoof; hence the bar-lugs K K K are formed or fitted to plates L of various lengths.

By my present improvement I facilitate a ready and firm attachment to its appropriate side section of the particular plate which may be selected for the purpose, and this I accomplish by forming a transverse recess, M, to extend inwardly from the inner edge on the inner or hoof face of the section nearly across the width thereof, and which is adapted to receive and closely embrace the beveled edges of the plate L, upon which the bar-lug is formed or fitted, the edge of the recess M being enlarged or projected outward in the form of offsets N N, which, when the plate L is fitted in the recess and adjusted to bring its lug K in proper position with reference to the bar of the foot, are to be hammered down and upset upon the beveled edges of the plate, so as to securely lock and hold it in place, as shown in Fig. 7.

The edges of the plate L are preferably notched, as well as beveled, as shown at P P, Fig. 5, to afford a better hold for the offsets N N upset and riveted down therein.

The recess M is preferably made so much longer than the plate L of the lug as to permit of a longitudinal adjustment of the plate therein, so as to permit the lug K to be carried out more or less from the longitudinal center of the section, in order to fit it to engage properly the bar of any foot upon which the section is to be secured. By means of this facility for adjustment of the lug to and from the middle of the section, the necessity for a large assortment of lug-plates of various sizes is obviated.

As a modification of my invention, I purpose imparting a T-shaped form to the inner end of the recess M', to receive a counterpart T-shaped lug-plate, L', as shown in Fig. 6.

I do not claim, broadly, the use of adjustable bar-lugs with the heel-sections of a horseshoe; but

I claim as my invention—

The combination, with the heel-section of a horseshoe having a recess formed transversely in the inner or hoof side of the section, and whose side edges are adapted to be bent down therein, of a plate fitting in said recess to be secured by upsetting said side edges and a bar-lug projecting from the end of said plate, substantially in the manner and for the purpose herein set forth.

In testimony whereof I have signed my name to this specification in the presence of two subscribing witnesses.

EDWARD W. BINGHAM.

Witnesses:
 A. N. JESBERA,
 M. E. FINLEY.